May 14, 1968

I. D. CLARK 3,382,847

AUTOMATIC LIVESTOCK FEEDER

Filed March 11, 1966

INVENTOR
*Ivan D. Clark.*

May 14, 1968     I. D. CLARK     3,382,847

AUTOMATIC LIVESTOCK FEEDER

Filed March 11, 1966     2 Sheets-Sheet 2

*INVENTOR*
*Ivan D. Clark.*

United States Patent Office 3,382,847
Patented May 14, 1968

3,382,847
AUTOMATIC LIVESTOCK FEEDER
Ivan D. Clarke, Rte. 2, Cross Plains, Tex. 76443
Filed Mar. 11, 1966, Ser. No. 533,464
7 Claims. (Cl. 119—51.11)

ABSTRACT OF THE DISCLOSURE

Following is disclosed an automatic livestock feeder which includes a rotating and compartmented metering dispenser which receives animal feed from a hopper and dispenses the feed in metered amounts. The dispenser has a holding wheel, the rotation of which is periodically interrupted by a timed brake means. To protect the brake means a holding wheel is connected with the dispenser and has a plurality of retractable pins urged outward periodically and in response to rotation of the wheel to engage a balance arm. Variable weights on the balance arm act through an engaged pin to offset the force of the feed in the dispenser to relieve the force applied to the brake means. When the brake means is periodically released, a resulting slight rotation of the wheel causes retraction of the pin and release from the influence of the variable weight.

---

The feeding of a number of livestock at the same time, in a barn or the like presents a problem. This is particularly true if time and the general overall efficiency of the feeding operation is essential, as it is if the livestock is the means by which one earns a living.

It is, therefore, the principal object of this invention to provide an improved livestock feeder that is fully automatic in its operation, thereby releasing for other duties the people who were normally required for this purpose.

Another object of this invention is to provide in an automatic livestock feeder a balance system which relieves the forces otherwise applied to a timed brake means used to control movement of a rotating metering dispenser.

Another object of this invention is to provide an automatic livestock feeder of the character described that will feed any number of animals at the same time.

Still another object of this invention is to provide an automatic livestock feeder that is activated by an electric clock, previously set to a predetermined feeding time; the electric clock and related mechanism being powered by electric batteries or the like, as will hereinafter be described.

Other and further objects will come to mind as one continues to read the detailed description and method of operation of this invention.

Figure 1:
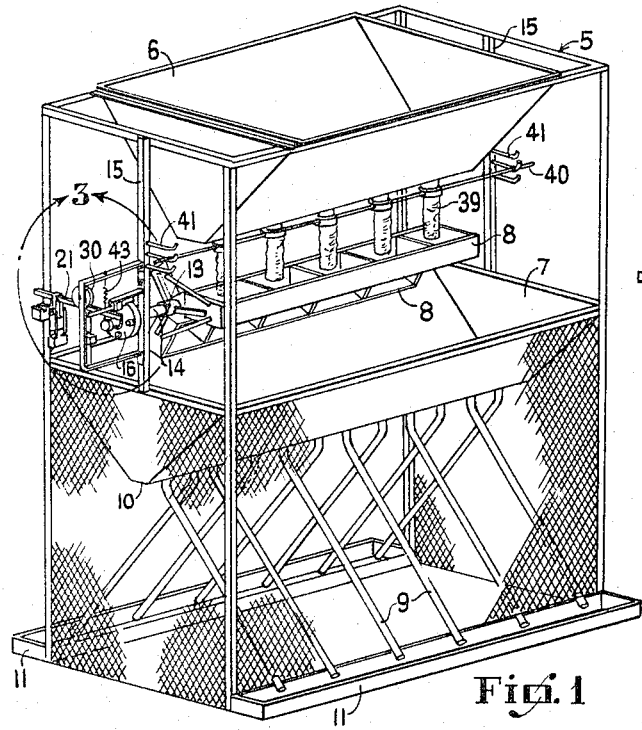
FIG. 1 is a perspective view of this invention.

In the drawing, like numbers indicate like parts throughout the several views of this invention. The number 5 indicates a rectangular framework having a hopper 6 that is V-shaped, when viewed from either end, mounted at the top thereof. The hopper is the storage bin for the feed for the animals. A second hopper 7, that is similar to the first-mentioned hopper, is located directly under hopper 6 at the predetermined vertical distance that provides space in which the rotating feed boxes 8, which are portions of a rotating and compartmented metering dispenser that will shortly be described. The aforesaid second-mentioned hopper 7 is actually a food distributing hopper, and it is by this name that it will hereinafter be known throughout this specification and its appended claims. A plurality of angularly disposed tubes 9 extend outward from the apex or bottom 10 of the aforesaid distributing hopper 7 to a point just above the two parallel and spaced feeding rectangular hoppers 11, as one can see by examining FIGURE 1 of the drawing. The aforesaid tubes 9 are in equal and longitudinal spaced relation to each other throughout the full length of this invention. As can be seen by FIGURE 1 of the drawing, every other tube 9 extends to the opposite feeding hopper 11.

Figure 2:
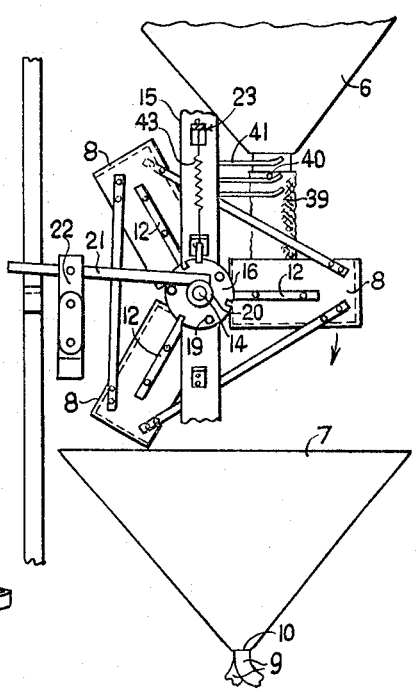
FIG. 2 is an enlarged end view of that portion of this invention enclosed within the arrowed circle and indicated by the numeral 3 in FIGURE 1.
Figure 3:
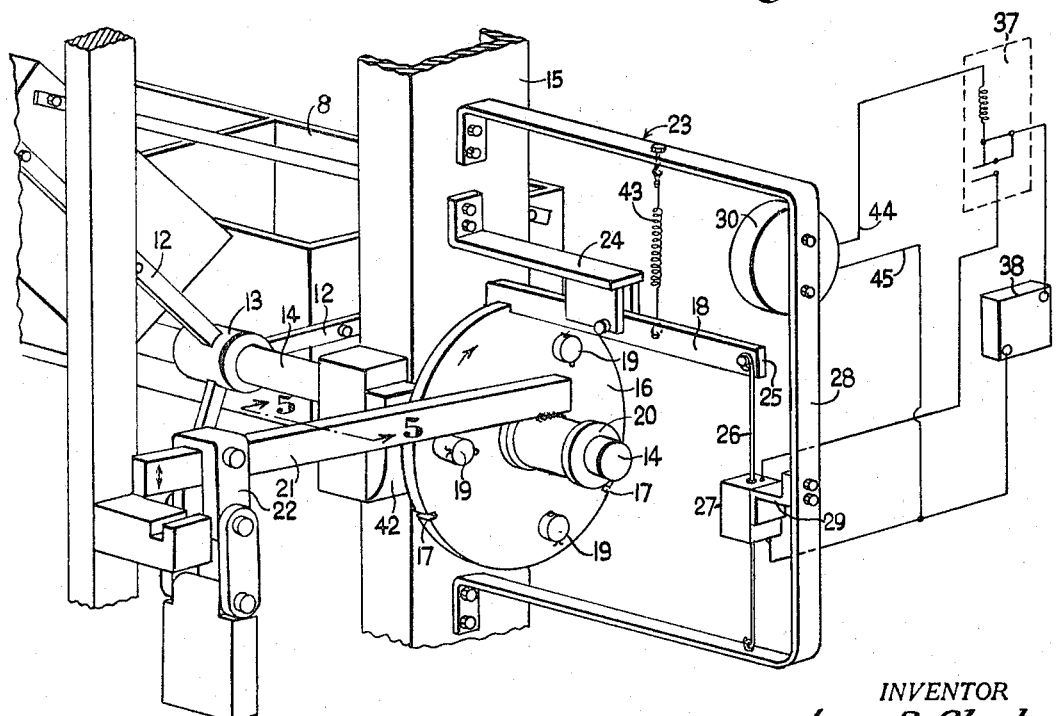
FIG. 3 is a perspective view of the mechanism illustrated in FIGURE 2 as well as a diagram of its electrical circuit.
Figure 4:
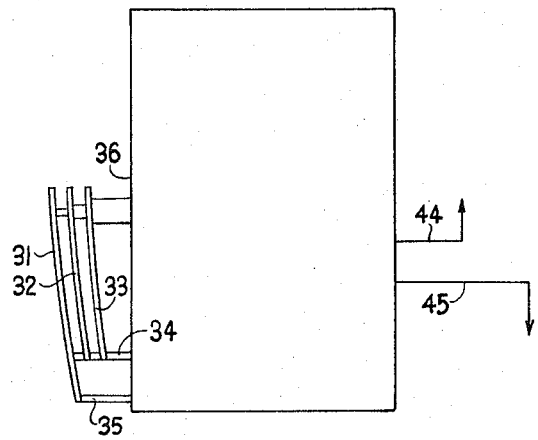
FIG. 4 is a side view of the electric clock that forms a part of this invention.
Figures 5, 6:
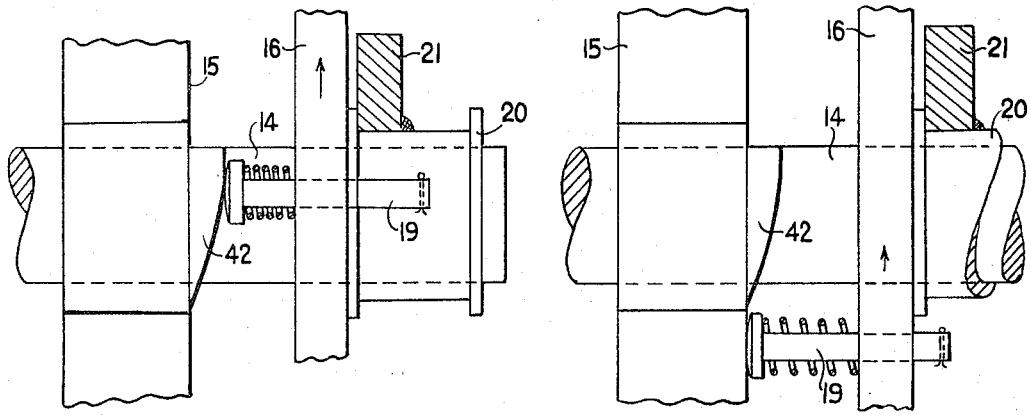
FIG. 5 is a view taken in the direction indicated by the horizontally disposed arrowed line, and indicated by the numeral 5 in FIGURE 3.
FIG. 6 is a view of the mechanism shown in FIGURE 5 but parts of the mechanism have been moved into another position.

Directing one's attention now to FIGURES 2 and 3 of the drawing, it will be seen that, in this instance, there are three equally and radially spaced rotating feed boxes 8 supported at each end by a bar 12 which extends radially outward from the hub 13. This hub 13 is secured onto the shaft 14 that is supported at each end of this invention by a vertically disposed channel 15 which is part of the aforesaid framework 5 of this invention. A rotatable feed box holding element 16 (in this instance a wheel) is secured to the outer end of the aforesaid shaft 14, is provided with the same number of preferably U-shaped circumferentially spaced grooves or recesses 17 in its periphery as there are feed boxes 8. Each recess in the wheel 16 is located slightly off the center line of one end of each feed box when this invention has been assembled. The purpose of the U-shaped recesses is to receive one end of the trip lever 18 which is a portion of a timed brake means which will be described in that part of this specification that deals with the operation of the invention. The aforesaid feed box holding wheel 16 is also provided with the same number of spring-loaded and retractable pins 19 as there are U-shaped recesses 17. The location of the just mentioned pins is clearly shown in FIGURES 2 and 3 of the drawing as adjacent cam means 42 which extend and retract the pins into and from engagement with a balance arm 21 as also shown in FIGURES 2 and 3 a free-turning bushing 20 is mounted on the outermost end of the shaft 14. One end of the balance arm 21 is welded, or otherwise secured, to the periphery of the bushing 20 while the other end of the arm provides support for the balance weights 22 which functions as variable weight balance means and which can be slid along the arm according to the amount of food that is to be received in each one of the feed boxes 8. A U-shaped strap 23 is bolted, or otherwise secured, to the outside of the aforesaid channel 15. The strap 23 encompasses the previously described feed box holding wheel 16 and its associated mechanism which includes the cantilever arm 24 from the outer end of which is swingably secured the aforesaid trip lever 18. This aforesaid trip lever 18 is secured with a biasing means 43 and has its outer end 25 secured to the upper end of the rod 26 or its equivalent to the vertical center of which is secured the solenoid 27 that in turn is also anchored to the vertically disposed member 28 of the aforesaid U-shaped strap 23 by means of the Z-shaped member 29. The aforesaid solenoid 27 is connected by electric wires to both the battery activated clock 30, which obviously contains a second hand 31, a minute hand 32, and an hour hand 33, as well as two electric connections 34 and 35 which are not only radially movable around the clock, but which project horizontally outward from the face 36 of the clock. By so doing, the two aforesaid connections will come into contact with the above mentioned hands of the clock, as will hereinafter be described in that part of this specification which describes the method of operation of this invention. The aforesaid solenoid 27 is also connected to the relay switch 37 and the electric battery 38, as one can see by looking at FIGURE 3 of the drawing.

The only other parts of this invention that have not previously been mentioned are the flexible canvas spouts 39 that extend downward from the aforesaid hopper 6 of this invention in which the food is first placed. The flow of the food is controlled by means of the vertically adjustable bar 40 that extends the full length of the invention. The bar 40 is adapted to raise and lower the spouts 39 above the aforesaid rotating feed boxes 8 of this invention. From looking at FIGURES 1 and 2 of the drawing it will be seen that the aforesaid bar 40 can be placed on any one of the desired horizontally disposed bar supports 41 that extend outward from each end of the aforesaid vertically disposed channel 15. The just mentioned bars can be replaced by any other structure or device that will manually control the flow of feed from the hopper 6 to the rotating feed boxes 8.

The way in which this novel invention of an automatic livestock feeder works is as follows:

Feed for livestock is placed in the hopper 6 from which it flows down through the canvas spouts 39 into the rotating feed boxes 8. The flow of the feed into the aforesaid rotating feed boxes 8 is controlled by means of the vertically adjustable bar 40, as has been previously stated. When each feed box 8 has received the desired amount of feed, the box will swing on around and dump its contents down into the feed distributing hopper 8 from which it will flow down through the angularly disposed tubes 9 on into the rectangular feeding receptacles 11 of this invention. It is obvious that the force produced by the weight of the feed being placed in one of the feed boxes 8 will place a strain on the trip lever 18, thus requiring a much larger force to move the inner end of the trip lever from the U-shaped recess in the holding wheel 16 of this invention. This problem of force is overcome by means of the balance system whose detailed parts have previously been described in this specification. As the feed boxes 8 and the holding wheel 16 rotate clockwise, the head of one of the pins 19 that is located in the just mentioned wheel, encounters the angularly disposed face of the cam 42. As the wheel 16 rotates, the pin slides up the cam, the pin thus is forced outward into position to make contact with the underside of the balance arm 21. As this contact is made, the wheel 16 is now in position for the inner end of the aforesaid trip lever 18 to fall down into one of the U-shaped recesses 17 in the wheel 16. The aforesaid balance weights 22, that are located on the outer end of the arm 21, are so positioned as to offer a force of resistance that is slightly less than the downward force of the feed that is now in one of the rotating feed boxes 8. When the often mentioned trip lever 18 has its inner end pulled upward from the U-shaped recess in the wheel 16, by the method hereinafter described in detail, the wheel 16 will again rotate in a clockwise direction by the previously mentioned weight of the feed. This causes the head of the pin 19, that is on the face of the ram 42, to slip off the ram and thus be pushed backward by the coil spring that encompasses that part of each pin that is located between the inner face of the wheel 16 and the head of the pin which now is pushed free of the aforesaid balance arm 21. This allows the holding wheel 16 to rotate and thus dumps the feed, in the feed box 8, on into the feed distributing hopper 7. At the same time another one of the feed boxes 8 is automatically positioned to receive more feed from the hopper 6.

The rotation of the aforesaid feed boxes 8 is actually controlled by electric timing apparatus. This works in the following manner:

The electric clock 30, which is preferably a twenty-four hour clock, is set for whatever time one desires the livestock to be fed. This is accomplished by moving the two electric contacts 34 and 35 at which all three of the hands of the clock will line up directly such as 6:33, 12:00 or 8:38 and so on. For example, suppose one wants the livestock to be fed at 6:33. The aforesaid electric contacts 34 and 35 will be moved to that position on the face 36 of the clock so that when the hour hand 33 reaches a point three minutes after the "6" the electric contact that is made onto the back of the hour hand (not shown in the drawing) will be touching the innermost one of the electrical contacts, that is contact 34. When the minute hand 32 reaches the point three minutes after the "6," the minute hand will be in direct line with the contact on the hour hand 33. As the second hand 31 sweeps around the face of the clock, the second hand will come into direct line with the aforesaid hour hand 33 and the minute hand 32 at the point three minutes after the "6" and the electrical contact point on the second hand 31 brushes the electrical contact point on the aforesaid minute hand 32 and the outermost electric contact 35 on the clock 30 and for an instant the electric circuit is completed. When this completion of the electric circuit happens, the aforesaid relay switch 37 is activated, thereby closing the circuit to the solenoid 27. The rod 26 is then pulled downward by the just-mentioned solenoid, thereby releasing the inner end of the trip lever 18 from the U-shaped recess 17 in the periphery of the holding wheel 16 which is, as previously stated, secured to the shaft 14. This shaft 14 supports the radially disposed feed boxes 8, one of which, being filled with feed, will now rotate and thus dump the feed down into the food distributing hopper 7 from which it will flow through the aforesaid angularly disposed tubes 9 down on into the feeding receptacles 11.

As the second hand 31 of the clock 30 swings on past the point at three minutes after the "6," the electric circuit to the relay switch 37 is broken, as is the circuit to the solenoid 27. The aforesaid trip lever 18 will now be pulled into a locking position by means of the coil spring 43, thus obviously locking the feed boxes 8 into the proper positions, until the next time of feeding. It should be noted in the drawings that the electric wires leading to and from the aforesaid clock 30 are indicated by the reference numbers 44 and 45, respectively.

It is to be understood that the detailed parts of this novel invention, as well as the arrangement and location of the parts, may be changed and equivalents substituted in so long as the changes and modifications fall within the scope and intent of the appended claims.

What I now claim as new and desire to secure by Letters Patent is:

1. In an automatic livestock feeder having a feed hopper, a rotating and compartmented metering dispenser which rotates upon receiving feed from said hopper, the improvement comprising:
   a holding wheel mounted on a shaft driven by rotation of said dispenser;
   retractable pins carried by said holding wheel to extend and retract longitudinally relative to the rotational axis of said wheel;
   a balance arm having an inner portion rotatably confined to said shaft;
   variable weight balance means carried by an outer portion of said arm;
   means engaging said retractable pins to selectively urge a pin into engagement with an underside of the balance arm and thereafter retract the pin responsive to predetermined degrees of rotation of the holding wheel; and
   timed controlled brake means communicating with the holding wheel to periodically prevent rotation and subsequently allow rotation thereof.

2. The livestock feeder defined by claim 1 in which said timed controlled brake means comprises: a pivotable trip lever having one portion adapted to engage recesses in the holding wheel; biasing means secured to said trip lever to engage the arm with a recess; and a timer controlled means periodically activating said trip lever.

3. The livestock feeder defined by claim 2 in which said timer controlled means includes a solenoid which is activated by a timer means.

4. In an automatic livestock feeder having a feed hopper, a rotating and compartmented metering dispenser which rotates upon receiving feed from said hopper, the improvement comprising:
- a rotatable holding element mounted on a shaft driven by rotation of said dispenser;
- a balance arm having one end mounted adjacent said holding element;
- retractable pins extending from a selected one of said balance arm and said rotatable holding element into periodic engagement with the other;
- variable weight balance means carried by an outer portion of said arm;
- means engaging said retractable pins to extend and retract them responsive to rotation of said holding element; and
- timed controlled brake means communicating with the holding wheel to periodically prevent rotation and subsequently allow rotation thereof.

5. The livestock feeder defined by claim 4 in which said timed controlled brake means comprises: a pivotable trip lever having one portion adapted to engage recesses in the holding wheel; biasing means secured to said trip lever to engage the arm with a recess; and timer controlled means periodically activating said trip lever.

6. The livestock feeder defined by claim 5 in which said timer controlled means includes a solenoid which is activated by a timer means.

7. In an automatic livestock feeder having a feed hopper, a rotating and compartmented metering dispenser which rotates upon receiving feed from said hopper, the improvement comprising:
- a holding wheel supported by a suitable shaft and having circumferentially spaced grooves on its periphery;
- a like number of spring biased pins projecting through the face of the wheel;
- a balance arm having one end rotatably confined to an axis homocentric with that of the holding wheel;
- a variable balance weight carried by said arm;
- cam means engaging the pins to selectively urge a pin into engagement with the balance arm against the force of the balance weight and to thereafter retract the pin responsive to predetermined degrees of rotation of the holding wheel; and
- timed controlled brake means periodically engaging the holding wheel to stop rotation thereof simultaneously with pin engagement with the balance arm and subsequently allow rotation of the holding wheel.

References Cited

UNITED STATES PATENTS

| | | | |
|---|---|---|---|
| 579,245 | 3/1897 | Terry | 119—51.11 |
| 2,565,801 | 8/1951 | Byers | 119—56 |
| 3,199,731 | 8/1965 | Brauer et al. | 119—51.11 X |
| 3,234,911 | 2/1966 | Chubbuck | 119—51.11 |

HUGH R. CHAMBLEE, *Primary Examiner.*